United States Patent [19]

Grychtol

[11] Patent Number: 4,804,386
[45] Date of Patent: Feb. 14, 1989

[54] CHROMIUM COMPLEX DYE FOR POLYAMIDES OR LEATHER

[75] Inventor: Klaus Grychtol, Bad Duerkheim, Fed. Rep. of Germany

[73] Assignee: BASF Aktiengesellschaft, Ludwigshafen, Fed. Rep. of Germany

[21] Appl. No.: 151,610

[22] Filed: Feb. 2, 1988

[30] Foreign Application Priority Data

Feb. 21, 1987 [DE] Fed. Rep. of Germany ....... 3705646

[51] Int. Cl.$^4$ .......................... D06P 3/32; C09B 45/16
[52] U.S. Cl. ............................................. 8/437; 8/436;
8/686; 8/690; 8/692; 8/917; 8/924; 534/696;
534/697; 534/712
[58] Field of Search ..................... 534/697, 696, 71 D,
534/697, 712; 8/686, 456

[56] References Cited

U.S. PATENT DOCUMENTS 2,906,746  9/1959  Brasse et al. ........................ 534/696
3,941,765  3/1976  Wittwer et al. ..................... 534/602

FOREIGN PATENT DOCUMENTS 2922690  12/1980  Fed. Rep. of Germany .

Primary Examiner—A. Lionel Clingman

Attorney, Agent, or Firm—Oblon, Fisher, Spivak, McClelland & Maier

[57] ABSTRACT

A chromium complex dye of the formula

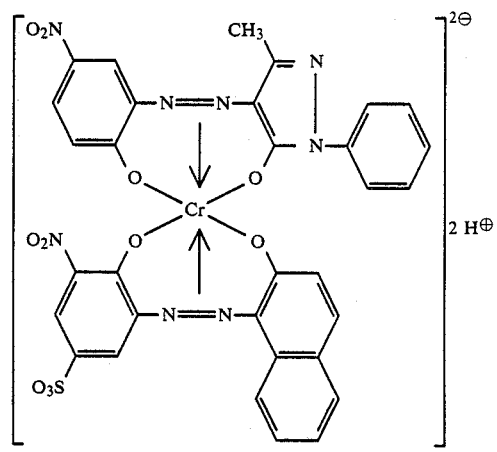

and salts thereof are used for dyeing polyamides or leather.

9 Claims, No Drawings

CHROMIUM COMPLEX DYE FOR POLYAMIDES OR LEATHER

The present invention relates to a novel chromium complex dye of the formula I

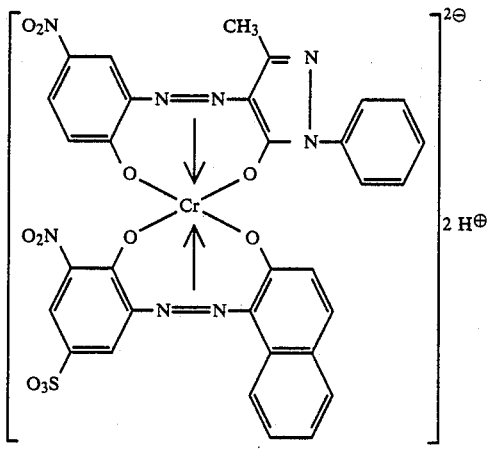

and to salts thereof.

Metal or ammonium salts are suitable. Metal salts are in particular the lithium, sodium or potassium salts. Ammonium salts, for the purposes of the present invention, are those salts which have either unsubstituted or substituted ammonium cations. Substituted ammonium cations are for example monoalkylammonium, dialkylammonium, trialkylammonium, tetraalkylammonium or benzyltrialkylammonium cations or those cations which are derived from nitrogen-containing five- or six-membered saturated heterocyclics, such as pyrrolidinium, piperidinium, morpholinium, piperazinium or N-alkylpiperazinium cations or N-monoalkyl- or N,N-dialkyl-substituted products thereof. Alkyl here refers in general to any straight-chain or branched $C_1$-$C_{20}$-alkyl which can be substituted by hydroxyl groups and/or interrupted by one to three nitrogen atoms.

Preference is given to those salts which have a lithium or a substituted ammonium cation. They are suitable in a particular way for producing liquid dye formulations.

The chromium complex dye according to the invention is prepared in a conventional manner. For example, the 1:1 chromium complex of the azo dye of the formula II

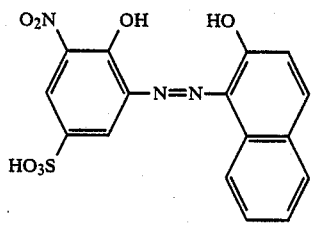

can be combined with the azo dye of the formula III

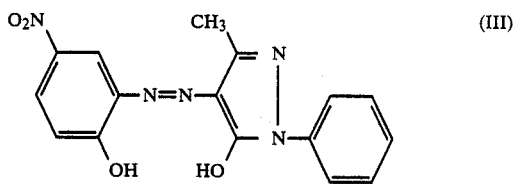

Details of the preparation may be found in Example 1.

The novel chromium complex dye of the formula I and the salts thereof are suitable in an advantageous manner for dyeing polyamides, such as wool, polycaprolactam or nylon, and also for leather.

DE-A-No. 1,012,007 discloses a chromium complex dye in which, compared with the dye according to the invention, the nitro and sulfo groups have changed place. Surprisingly, the chromium complex dye according to the invention is distinguished by better ratings in fulling and cross-dyeing fastness.

The Examples which follow serve to illustrate the invention in more detail.

EXAMPLE 1

(a) 468 g of 6-nitro-2-aminophenol-4-sulfonic acid were suspended in 2,000 ml of water and 500 g of ice. The suspension was diazotized by the dropwise addition of 610 ml of 3.3N sodium nitrite solution. Excess nitrite was destroyed with sulfamic acid after 45 minutes of stirring. The diazo solution was then run into a solution of 306 g of 2-hydroxynaphthalene in 2,000 ml of water, 145 g of sodium hydroxide and 500 g of ice. The coupling was complete in a short time. The coupling mixture was then brought to pH 1.0 with 400 ml of concentrated hydrochloric acid. A hot solution of 160 g of chromium(III) oxide in dilute formic acid was then added for chromation at 135° C., in the course of which the pressure rose to 3.5 bar. The chromation was complete after three hours. After cooling down, the mixture was filtered off with suction to leave 1,460 g of a filtercake which was further reacted in the moist state.

(b) 293 g of 4-nitro-2-aminophenol were suspended in 800 ml of water and 300 g of ice. The suspension was brought to pH 1.0 with concentrated hydrochloric acid, and the temperature was reduced to −3° to 0° C. by adding 1,300 g of ice. 570 ml of 3.3N sodium nitrite solution were then run in. The diazotization was complete after 40 minutes. The diazo suspension was then rapidly added to a solution of 344 g of 1-phenyl-3-methylpyrazol-5-one in 1,900 ml of water, 76 g of sodium hydroxide, 170 g of sodium acetate and 700 g of ice. After the coupling had ended, the pH was adjusted to 0.3 with 400 ml of concentrated hydrochloric acid. The temperature was then raised to 65° C. and the mixture was filtered with suction. Subsequent washing neutral with 8,000 ml of water left 1,770 g of a filtercake which was further used in the moist state.

(c) The 1,770 g of filtercake from stage (b) were suspended in 4,000 ml of water. The moist process cake from stage (a) was then added, and the temperature was raised to 90° C. The pH of reaction was maintained within the range from 7.8 to 8 with a total of 163 g of sodium hydroxide. The end of the reactin was monitored by thin layer chromatography. Spray-drying the dye suspension gave 1,658 g of the brown dye in the form of the sodium salt.

EXAMPLE 2

Wool was dyed on the one hand with the dye according to the invention in the form of the sodium salt and on the other with the dye (again in the form of the sodium salt) disclosed in DE-A-No. 1,012,007 (Table, dye No. 4). The wool thus treated gave the following fastness ratings (bleeding):

|  | Dye according to the invention | Dye as described in DE-A-1,012,007 |
|---|---|---|
| Fulling fastness acid, light (DIN 54,042) | 4–5 | 3 |
| Fulling fastness acid, heavy (DIN 54,043) | 3–4 | 1–2 |
| Cross-dyeing fastness sulfuric acid pH (DIN 54,049 - method S) | 2–3 | 1 |

I claim:

1. The chromium complex dye of the formula I

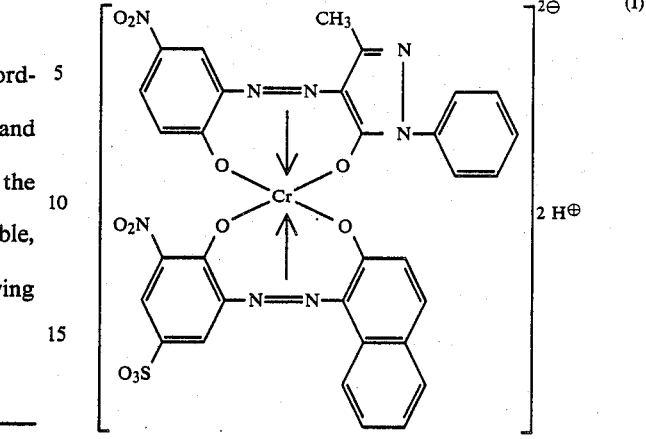

and salts thereof.

2. A process for using a chromium complex dye, or a salt thereof, as claimed in claim 1 for dyeing polyamides or leather.

3. The dye of claim 1, wherein said salt is a metal or ammonium salt.

4. The dye of claim 3, wherein said ammonium salt is a monoalkyl ammonium salt, a dialkyl ammonium salt, a trialkyl ammonium salt, a tetraalkyl ammonium salt, or a benzyltrialkyl ammonium salt.

5. The dye of claim 1, wherein said salt is a salt comprising a nitrogen-containing 5- or 6-membered saturated heterocyclic compound which is one member selected from the group consisting of pyrrolidinium, piperidinium, morpholinium, piperazinium, N-monoalkyl substituted products thereof, and N,N-dialkylsubstituted products thereof.

6. The dye of claim 1, wherein said salt is a lithium salt or a substituted ammonium salt.

7. The process of claim 2, comprising dyeing a polyamide.

8. The process of claim 7, wherein said polyamide is wool, a polycaprolactam, or a nylon.

9. The process of claim 2, comprising dyeing leather.

* * * * *